J. MARQUIS.

SLOP-HOPPER.

No. 7,679. Reissued May 15, 1877.

WITNESSES:

John H. Pitts

Julien Sassalette.

INVENTOR:

John Marquis.

Per Pitts

Lionel Varicas

N. PETERS, PHOTO-LITHOGRAPHER, WASHINGTON, D. C.

UNITED STATES PATENT OFFICE.

JOHN MARQUIS, OF SAN FRANCISCO, CALIFORNIA.

IMPROVEMENT IN SLOP-HOPPERS.

Specification forming part of Letters Patent No. 57,742, dated September 4, 1866; reissue No. 7,679, dated May 15, 1877; application filed October 16, 1876.

*To all whom it may concern:*

Be it known that I, JOHN MARQUIS, a resident of the city and county of San Francisco, State of California, have invented certain new and useful Improvements in Slop-Hoppers for Sinks or Drains; and I do hereby declare the following description and accompanying drawings are sufficient to enable any one skilled in the art or science to which it most nearly appertains to make and use my said invention without further invention or experiment.

The first part of my invention consists in the employment of a stationary hopper, in which is placed a movable or adjustable hopper, which can be so far removed or lifted out as to be emptied of the accumulated débris when desired.

The second part of my invention consists in the introduction of traps near the top or bottom for the purpose of preventing the return of the effluvia from the drain.

Figure 1:
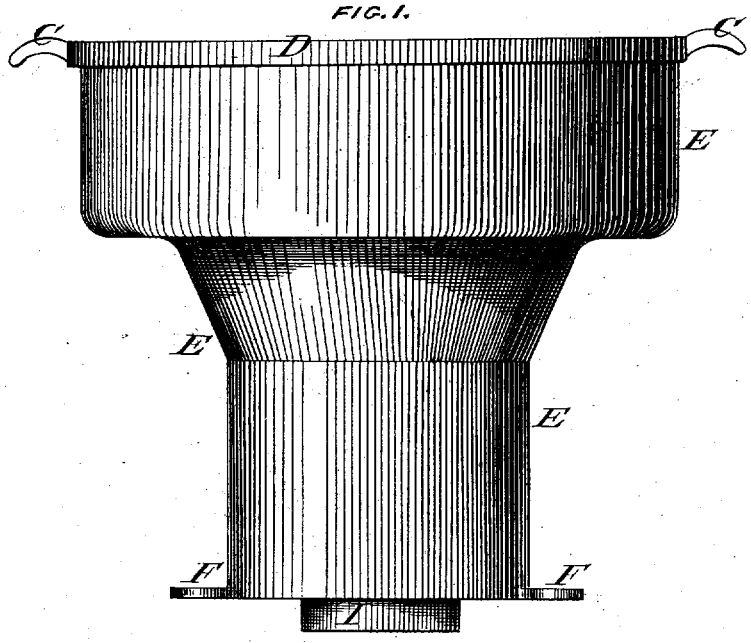
Figure 2:
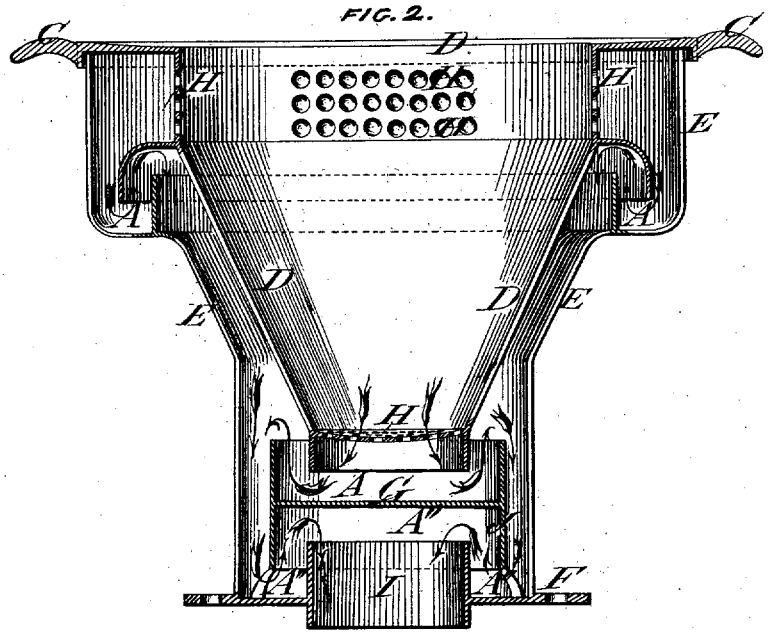

To enable others skilled in the art to which it more clearly belongs, I will proceed to describe the construction and operation, as follows:

Figure 1 is a longitudinal vertical elevation or front view of a stationary and adjustable hopper, provided with traps both at the top and bottom, embodying my invention. Fig. 2 is a vertical section of Fig. 1.

With reference to the drawings, E E is the stationary hopper, open at the top, and having a place of connection, I, to which the sewer-pipe is attached; also, the flanges or lugs F, for the purpose of securing it firmly to its place.

The movable or adjustable hopper D D is perforated, and is provided with a rim around the top, or handles C C may be attached so that it can be conveniently moved for the purpose of emptying the débris.

The perforations are for the purpose of allowing the water to pass through into the stationary receptacle, hence into the sewer, while the solid matter is retained, so that it can be removed from the premises.

A A A A″ are the traps. The lower trap A″ is formed by a continuation of the connecting-pipe I and the lower bowl or pan G, which bowl rests upon standards, or is suspended to the movable hopper sufficiently high to allow the matter to pass off freely into the sewer or drain through the connecting-pipe I.

The upper traps A A A are formed first by placing the rim or flange J J around the pan G, in which the lower portion of the movable hopper is placed; also, by placing strips of metal around the inner casing of the hopper E and around the movable hopper D, and so, when the hoppers are in place, form the trap A A A, which, when filled with water, will prevent the return of the effluvia from the sewer.

My hopper may be constructed of iron or other materials. If made of iron it may be galvanized. Copper may be used for constructing the adjustable hopper D.

The upper bands or traps A A A may be dispensed with entirely, as the lower ledge will always be filled with water, which will then form a single-trapped hopper. By this arrangement of slop-hopper it is intended that no effluvia shall return from the drain or cess-pool.

The water, being carried into the adjustable hopper, passes through the perforations H H H, and is carried downward in the direction of the arrows, filling the spaces A A A A″ around the ledges at the top or bottom, allowing the overflow to escape through the connecting-pipe I, while the noxious gases are prevented from choking up the pipe, and can easily be removed or emptied out by means of the adjustable hopper.

Having thus described my invention of a slop-hopper, what I claim as new, and desire to secure by Letters Patent, is—

1. The stationary hopper E E and movable hopper D D, constructed and arranged together in the manner described, substantially as and for the purposes herein set forth and specified.

2. The combination, substantially as specified, of the pan G, the outer hopper, the exit-pipe thereof, and the inner hopper.

3. The trap formed by the rim J J, and the lower portion of the movable hopper D D, substantially as described, and for the purposes herein set forth and specified.

4. A slop-hopper having a perforated movable receptacle, substantially as described, and for the purposes herein set forth and specified.

5. A slop-hopper having a trap, A, near the top, substantially as and for the purpose specified.

JOHN MARQUIS.

Witnesses:
LIONEL VARICAS,
ALFRED C. CRANE.